United States Patent
Zhao et al.

(10) Patent No.: US 11,080,107 B2
(45) Date of Patent: Aug. 3, 2021

(54) EVENT NOTIFICATION METHOD, SERVER DEVICE, EVENT NOTIFICATION APPARATUS, AND MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Qian Zhang, Beijing (CN); Yanqiu Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/519,525

(22) Filed: Jul. 23, 2019

(65) Prior Publication Data
US 2020/0174855 A1 Jun. 4, 2020

(30) Foreign Application Priority Data
Nov. 30, 2018 (CN) .......................... 201811454645.7

(51) Int. Cl.
  *G06F 9/54* (2006.01)
  *G06F 9/50* (2006.01)

(52) U.S. Cl.
  CPC ............ *G06F 9/542* (2013.01); *G06F 9/5022* (2013.01); *G06F 9/5061* (2013.01)

(58) Field of Classification Search
  CPC ...................................................... G06F 9/542
  USPC ........................................................ 719/318
  See application file for complete search history.

(56) References Cited

U.S. PATENT DOCUMENTS

| | | | | |
|---|---|---|---|---|
| 10,476,758 B2* | 11/2019 | Marvin | .................... | H04L 41/50 |
| 2003/0046395 A1* | 3/2003 | Fleming | .................. | G06F 9/542 |
| | | | | 709/226 |
| 2019/0313212 A1* | 10/2019 | Lee | ......................... | H04W 4/029 |
| 2019/0340041 A1* | 11/2019 | Banisadr | ................. | H04L 67/26 |

* cited by examiner

*Primary Examiner* — Andy Ho

(57) ABSTRACT

An event notification method, including: receiving an event subscription request from a subscriber, the event subscription request including at least one notified party; sending a first event notification to the at least one notified party; sending a second event notification to at least a part of the at least one notified party, the second event notification being for canceling the first event notification.

20 Claims, 10 Drawing Sheets

EVENT NOTIFICATION METHOD, SERVER DEVICE, EVENT NOTIFICATION APPARATUS, AND MEDIUM

TECHNICAL FIELD

The present disclosure relates to the field of Internet of Things, and more particularly to an event notification method, a server device, an event notification apparatus, and a medium.

BACKGROUND

With the development of information technology, especially Internet technology, IoT (Internet of Things) technology for informationization, remote management control, and intelligence has gradually matured. IoT uses communication technologies such as local networks or the Internet to connect sensors, controllers, machines, people, and objects in new ways to form connections between people and things, as well as between things and things. With the rapid development of IoT technology in various application fields, more and more devices are connected to IoT, and various new application fields such as smart home, smart transportation, and smart health have emerged. A terminal device connected to IoT can obtain data or event notification by way of sending a subscription request to the server entity. The IoT platform may send data or event notification to a notified party in the subscription request when a subscription condition is met.

SUMMARY

One aspect of the present disclosure provides an event notification method, comprising: receiving an event subscription request from a subscriber, the event subscription request including at least one notified party; sending a first event notification to the at least one notified party; sending a second event notification to at least a part of the at least one notified party, the second event notification being for canceling the first event notification.

According to some embodiments of the disclosure, sending a first event notification to the at least one notified party comprises: determining whether a first event notification rule is satisfied, and in the case where the first event notification rule is satisfied, sending a first event notification to each notified party of the at least one notified party.

According to some embodiments of the disclosure, sending a second event notification to at least a part of the at least one notified party comprises: determining whether a second event notification rule is satisfied, and in the case where the second event notification rule is satisfied, sending a second event notification to at least a part of the at least one notified party.

According to some embodiments of the disclosure, determining whether a second event notification rule is satisfied comprises: receiving a request from a requesting party; determining whether a second event notification rule is satisfied based on the request.

According to some embodiments of the disclosure, determining whether a second event notification rule is satisfied comprises: determining, at a time point determined by a second event notification interval, whether a second event notification rule is satisfied.

According to some embodiments of the disclosure, the method further comprises defining a first event notification resource and a second event notification resource associated with the first event notification resource, wherein the first event notification resource includes: a first event notification rule attribute for determining whether to send a first event notification; and a first event notification list attribute for storing address information of the at least one notified party, the second event notification resource includes: an event notification identifier attribute for associating the second event notification resource with the first event notification resource; a second event notification rule attribute for determining whether to send a second event notification; a second event notification list attribute for storing address information of the at least one notified party.

According to some embodiments of the disclosure, the second event notification resource further includes: a second event notification interval attribute for setting a time interval for determining whether a second event notification rule is satisfied.

According to some embodiments of the disclosure, the event subscription request includes a plurality of notified parties, and sending a second event notification to at least a part of the plurality of notified parties comprises: receiving an event cancel request from one notified party of the plurality of notified parties; sending, based on the event cancel request, a second event notification to at least a part of the plurality of notified parties.

According to some embodiments of the disclosure, the method further comprises defining a first event notification resource and a cancellation virtual resource associated with the first event notification resource, the cancellation virtual resource being for sending, based on the event cancel request, a second event notification to at least a part of the plurality of notified parties, wherein the first event notification resource includes: a first event notification rule attribute for determining whether to send a first event notification; and a first event notification list attribute for storing address information of the plurality of notified parties.

According to some embodiments of the disclosure, the method further comprises defining a first subscription resource and a second subscription resource associated with the first subscription resource, wherein the first subscription resource includes: a first event notification rule attribute for determining whether to send a first event notification; and a first event notification list attribute for storing address information of the at least one notified party, the second notification resource includes: an event notification identifier attribute for associating the second event notification resource with the first event notification resource; a second event notification rule attribute for determining whether to send a second event notification; a second event notification list attribute for storing address information of the at least one notified party.

According to some embodiments of the disclosure, the event subscription request is for requesting to receive update data from an application entity, the method further comprises: determining, based on the update data, whether the first event notification rule is satisfied.

According to some embodiments of the disclosure, notification content of the second event notification is opposite to notification content of the first event notification.

According to some embodiments of the disclosure, the second event notification rule is a rule for canceling the first event notification.

According to some embodiments of the disclosure, the method further comprises defining a first event notification resource and a second event notification resource associated with the first event notification resource, wherein the first event notification resource includes: a first event notification rule attribute for determining whether to send a first event notification; and a first event notification list attribute for storing address information of the at least one notified party, the second event notification resource includes: an event notification identifier attribute for associating the second event notification resource with the first event notification resource; a second event notification rule attribute for determining whether to send a second event notification; a second event notification list attribute for storing address information of the at least one notified party.

According to some embodiments of the disclosure, the method further comprises defining a first subscription resource and a second subscription resource associated with the first subscription resource, wherein the first subscription resource includes: a first event notification rule attribute for determining whether to send a first event notification; and a first event notification list attribute for storing address information of the at least one notified party, the second event notification resource includes: an subscription resource identifier attribute for associating the first subscription resource with the second subscription resource; a second event notification rule attribute for determining whether to send a second event notification; a second event notification list attribute for storing address information of the at least one notified party.

Another aspect of the present disclosure provides a server device, comprising a transceiver and a processor, wherein the transceiver is configured to receive an event subscription request from a subscriber, the event subscription request including at least one notified party; the processor is configured to instruct the transceiver to send a first event notification to the at least one notified party, and instruct the transceiver to send a second event notification to at least a part of the at least one notified party, the second event notification being for cancelling the first event notification.

According to some embodiments of the disclosure, the processor is configured to determine whether a first event notification rule is satisfied, and in the case where the first event notification rule is satisfied, instruct the transceiver to send a first event notification to each of the at least one notified party.

According to some embodiments of the disclosure, the processor is configured to determine whether a second event notification rule is satisfied, and in the case where the second event notification rule is satisfied, instruct the transceiver to send a second event notification to at least a part of the at least one notified party.

Another aspect of the present disclosure provides an event notification apparatus, comprising: one or more processors; and one or more memories in which computer-readable codes are stored, the computer-readable codes causing, when executed by the one or more processors, the event notification method of claim 1 to be performed.

Another aspect of the present disclosure provides a computer storage medium having stored thereon computer-readable codes, the computer-readable codes causing, when executed by the one or more processors, the event notification method of claim 1 to be performed.

BRIEF DESCRIPTION OF THE DRAWINGS

In order to more clearly illustrate the technical solutions in the embodiments of the present disclosure or in the prior art, drawings necessary for describing the embodiments or the prior art will be briefly introduced below, obviously, the below described drawings are only some embodiments of the present disclosure, for those skilled in the art, other drawings may also be obtained based on these drawings without paying creative efforts.

DETAILED DESCRIPTION OF THE EMBODIMENTS

Figure 1:
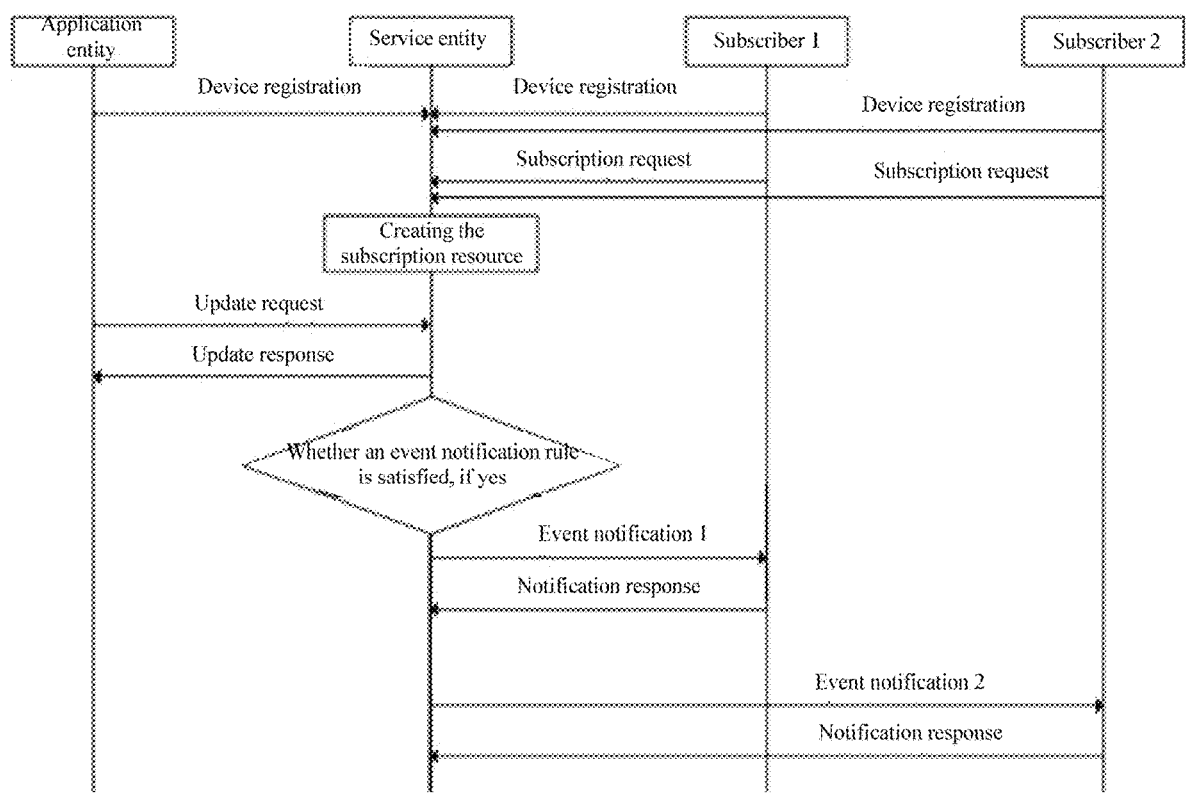
FIG. 1 illustrates a flow chart for performing event notification based on a subscription request.

Hereinafter, the technical solutions in the embodiments of the present disclosure will be described clearly and comprehensively in combination with the drawings thereof, obviously, these described embodiments are only parts of the embodiments of the present disclosure, rather than all of the embodiments thereof, all the other embodiments obtained by those of ordinary skill in the art based on the embodiments of the present disclosure without paying creative efforts fall into the protection scope of the present disclosure.

Words and expressions such as "first", "second" and the like used in the present disclosure do not denote any sequence, quantity or priority, but are used only to distinguish different components. Likewise, words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections.

The flow chart is used in the present disclosure to illustrate steps of the method according to some embodiments of the present application. It should be understood that the preceding or subsequent steps may not be necessarily performed precisely in order. Instead, the respective steps may be processed in reverse order or simultaneously. At the same time, other operations may be added to these processes, or one or several steps may be removed from these processes.

Internet of Things may serve as an extension of the Internet, it includes the Internet and all the resources on the Internet, and is compatible with all Internet applications. With the application of IoT technology in various fields, various new application fields such as smart home, smart transportation, and smart health have emerged.

With the development of the IoT technology, more and more terminal devices are connected to the IoT platform, such as smoke alarms, fire alarms, and many household appliances, and other devices. The IoT platform may be implemented, for example, as a universal service entity, and the terminal devices may be connected to the universal service entity by sending registration information to the universal service entity, and the universal service entity manages the terminal devices connected thereto. The terminal devices may be denoted as application entities, and an application entity connected to the universal service entity may perform operations such as data transmission, information interaction with the universal service entity. It should be noted that the application entity described herein may be respective types of terminal devices in IoT, or may be a software module or the like in the devices. Hereinafter, the universal service entity may be represented as a service entity.

Some application entities (e.g., serving as subscribers) may subscribe to information, data, etc. for example from other application entities (e.g., serving as subscribed parities) by sending a subscription request to the service entity, the subscribers may also request data, operations, etc. from the service entities, no limitations are made herein.

The subscription request may include a plurality of notified parties for receiving an event notification or data related to the subscription request. The subscription request may further include an event notification rule (i.e. subscription condition), that is, in the case where the event notification rule is satisfied (e.g., a smoke alarm gives an alarm), an event notification is sent to the notified parties in the subscription request. Thus, when the event notification rule in the subscription request is satisfied, the service entity sends an event notification to all notified parties included in the subscription request.

FIG. 1 illustrates a flow chart for a service entity performing event notification based on a subscription request. A subscriber 1, a subscriber 2, and an application entity may first connect to a service entity by sending a device registration request to the service entity. Next, the subscriber 1 and/or the subscriber 2 may send a subscription request to the service entity, for example, to request the service entity to send a reminder message to all family members if the air quality is poor (e.g., PM 2.5 index is higher than 300), so as to take protective measures in advance. In this example, the notified party in the subscription request includes all family members, and the PM 2.5 index being higher than 300 is the event notification rule of the subscription request. In the example shown in FIG. 1, the notified party is denoted as the subscriber 1 and the subscriber 2. The application entity connected to the service entity may, for example, be an air quality detection device that can detect air quality in real time and can send air quality detection data to the service entity periodically. The service entity determines whether the event notification rule is satisfied based on the received detection data, that is, whether the PM 2.5 index is higher than 300. In the case where that it is determined that the event notification rule is satisfied (i.e., the PM 2.5 index is higher than 300), the service entity will send an event notification to all the notified parties (such as a reminder message of the PM 2.5 index higher than 300).

Figure 2:
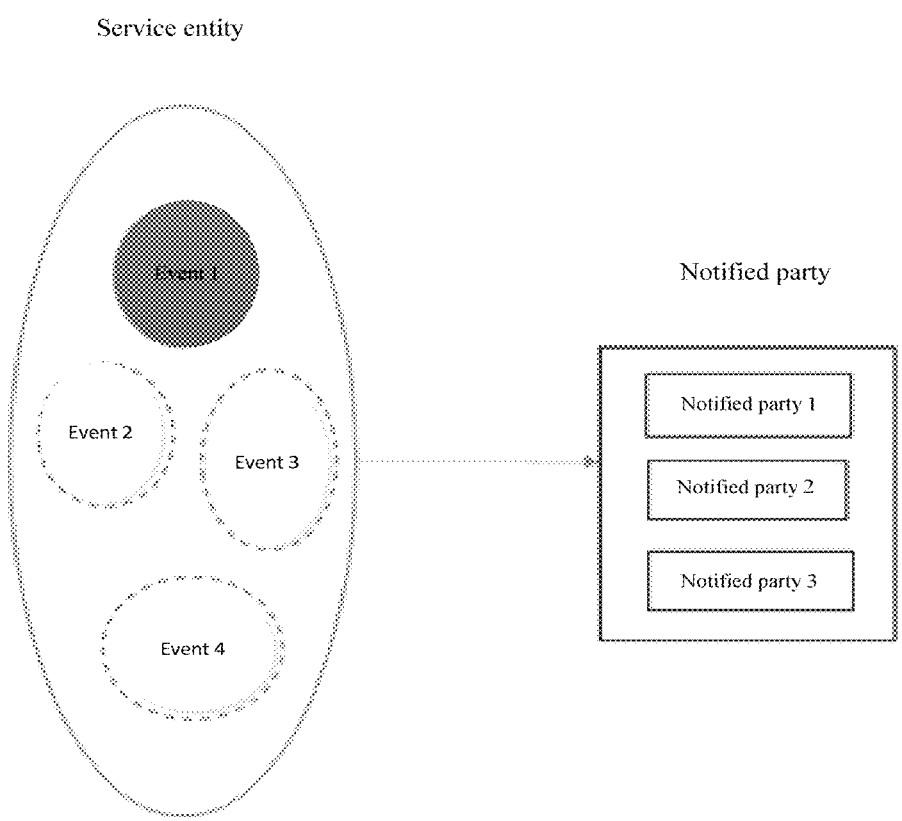
FIG. 2 illustrates a schematic diagram of a notified party for receiving an event notification.

It should be noted that the notified party included in the subscription request may be the same as the subscriber or may be different from the subscriber. FIG. 2 illustrates a schematic diagram of a notified party for receiving an event notification, for example, the service entity may denote the air quality related subscription request as event 1, and the notified party corresponding to the event 1 may be the subscriber and may also be a device that is different from the subscriber, for example, a notified party 1, a notified party 2, and a notified party 3.

The event notification requested in the above subscription request is a feature with real-time characteristic. For example, the air quality detection data may constantly change over time due to conditions such as wind speed. The air quality detection device may detect that the PM 2.5 index is higher than 300 at 6 am, and the universal service entity will determine that the event notification rule is satisfied based on this data and send an event notification to all family members. At 8 am, the air quality detection device detects the PM 2.5 index of 100. In this case, the family members that have received the event notification do not know the current air quality data in time, instead they perform some operations based on the event notification sent by the service entity for the first time (PM 2.5 index is higher than 300), for example, turning on the air purifier, closing doors and windows, etc., they fail to promptly follow the current air quality (PM 2.5 index of 100) to make proper operations, this will cause the notified parties to perform additional operations, which affects the real-time performance of event notification, reduces user experience, and also introduces unnecessary information interference to the notified parties that have received the event notification.

Figure 3:
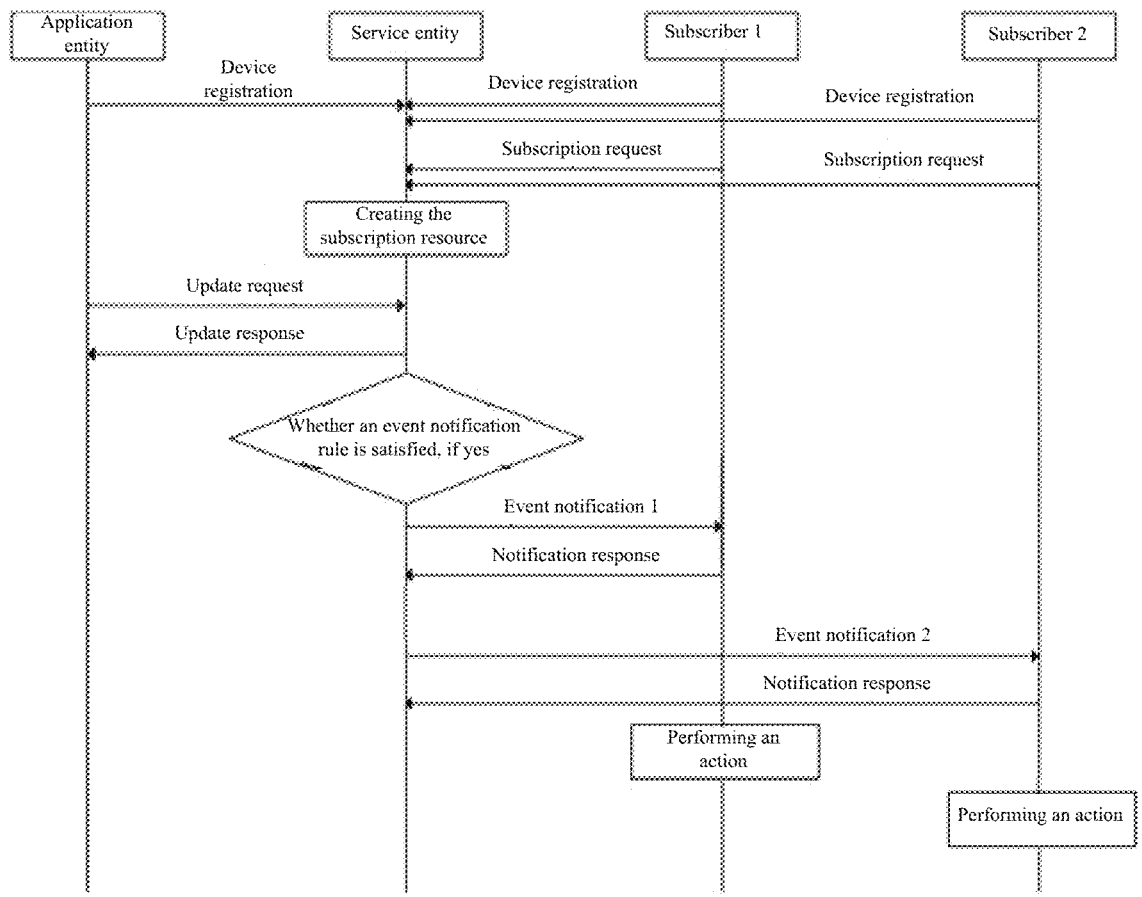
FIG. 3 illustrates a schematic diagram of a notified party performing an operation based on an event notification.

In another example, the subscription request may further be used to request an event notification to be sent to all family members when an electricity amount of a home electric meter is less than 5 degrees, so as to perform a processing operation in time, for example, paying an electricity bill, thereby avoiding occurrence of power failure. FIG. 3 illustrates a schematic diagram of a notified party performing an operation based on an event notification. The manner in which the subscriber sends the subscription request may be similar to the manner described in FIG. 1, and details are not described herein again.

In this example, the application entity may be a home electric meter configured to send update data containing a remaining electricity amount to the service entity. The service entity determines whether the remaining electricity amount is less than 5 degrees based on the update data sent by the house electric meter, and sends an event notification to all the notified parties when it is determined as less than 5 degrees. The notified party of the subscription request shown in FIG. 3 includes the subscriber 1 and the subscriber 2, after receiving the event notification that the remaining electricity amount is less than 5 degrees, the subscriber 1 and the subscriber 2 are likely to both perform an operation based on the notification, for example, sending a request to the service entity to pay the electricity bill. As a result, multiple notified parties perform repeated operations for the same event. For example, both the subscriber 1 and the subscriber 2 perform the operation of paying the electricity bill, resulting in a situation in which the balance of the home electric meter is excessive. If only one notified party is included in the subscription request, and if the notified party fails to deal with the event notification in time, the situation of the home power failure will occur, which affects the real-time operation to deal with the event notification.

The subscription request similar to the above-mentioned subscription request for remaining electricity amount may also be requesting to send an event notification to the notified party to perform the operation of opening the door upon receiving a triggering of the doorbell. The notified party in the subscription request may be all family members currently in the home, so as to perform the operation of opening the door in time after receiving the event notification. For example, when a deliveryman rings the doorbell, all notified parties will receive an event notification from the service entity, and thus each notified party sends a door open request to the service entity to request the service entity to perform the operation of opening the door. In this case, the service entity will open the door after receiving a door opening request from one notified party. After the service entity performs the operation of opening the door, the door opening requests sent by the other notified parties to the service entity are all invalid operations, because the door is already open. This means that the other notified parties perform invalid operations based on the event notification, which causes waste of resources, affects the real-time performance of event notification, and reduces user experience.

Thus, in the case where the content of event notification for the subscription request or the operation to be performed based on the event notification is real-time, the current event notification manner cannot satisfy the requirement of real-time performance, and causes the notified parties to perform additional operation.

Figure 4:
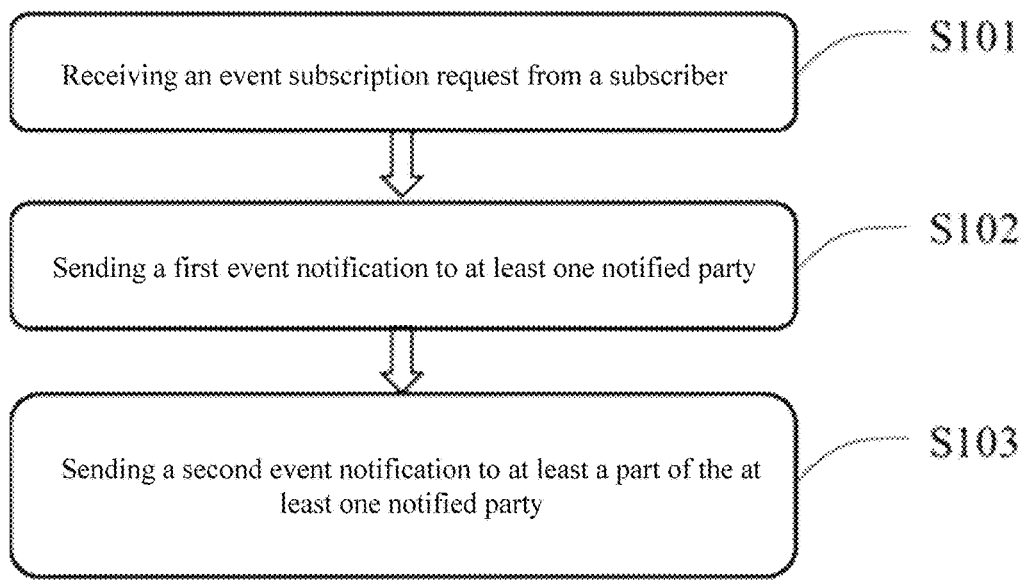
FIG. 4 illustrates a flow chart of an event notification method according to some embodiments of the present disclosure.

FIG. 4 illustrates a flow chart of an event notification method according to some embodiments of the present disclosure. First, in step S101, receiving an event subscription request from a subscriber, wherein the event subscription request includes at least one notified party. The subscriber may be an application entity connected to a universal service entity, it may, for example, send a subscription request to the service entity when needing certain data for operation, the subscription request may include a subscribed event or operation, and one or more notified parties that are to receive an event notification. In addition, the subscriber may be one or more, that is, there may be multiple subscribers that subscribe to a same event notification to the universal service entity. According to other embodiments of the present disclosure, after receiving the subscription request, the universal service entity will obtain an information list of all the notified parties, and the notified parties may be grouped based on type, level of the notified parties, content of the event notification, etc., for the purpose of more accurate event notification.

Next, in step S102, the server entity may send a first event notification to the at least one notified party. According to some embodiments of the present disclosure, the universal service entity may first determine whether an event notification rule is satisfied, and when the event notification rule is satisfied, a first event notification is sent to the notified parties in the at least one group. According to some embodiments of the present disclosure, sending a first event notification to the at least one notified party may comprise: determining whether a first event notification rule is satisfied, and in the case where the first event notification rule is satisfied, sending a first event notification to each of the at least one notified party. For example, the first event notification rule may be decided by a subscriber that sends a subscription request. The universal service entity may set the event notification rule by creating a first event notification rule attribute based on the subscription request, and store address information of the at least one notified party by creating a first event notification list attribute.

According to some embodiments of the present disclosure, the event subscription request may be used to request receipt of update data from an application entity, for example, in the example of a subscription request for remaining electricity amount of a home electric meter, the subscription request may be used to request data of the remaining electricity amount after the remaining electricity amount is lower than 5 degrees, at this time, the first event notification rule is that the remaining electricity amount is less than 5 degrees. The application entity acting as a home electric meter will periodically send an update request to the service entity to send the update data, i.e. the remaining electricity amount. The service entity may determine whether the first event notification rule is satisfied based on the update data, that is, whether the remaining electricity amount is lower than 5 degrees. When it is determined that the remaining electricity amount is lower than 5 degrees, for example, 4 degrees, the service entity sends the remaining electricity amount to all the notified parties.

Next, in step S103, the service entity may send a second event notification to at least a part of the at least one notified party, wherein the second event notification is used to cancel the first event notification. According to some embodiments of the present disclosure, sending a second event notification to at least a part of the at least one notified party may comprise: determining whether a second event notification rule is satisfied, and in the case where the second event notification rule is satisfied, sending a second event notification to at least a part of the at least one notified party.

In the example of the subscription request for air quality, the first event notification may be an event notification issued by the service entity upon detecting that the PM 2.5 index is above 300, and the second event notification may be a notification sent by the service entity to the notified party to cancel the first event notification when detecting that the PM 2.5 index is 100, that is, when the air quality index no longer satisfies the first event notification rule any more. In this example, content of the second event notification may be opposite to content of the first event notification. For example, in a case where content of the first event notification is that the PM 2.5 index is higher than 300, content of the second event notification may be that the PM 2.5 index is lower than 300. The second event notification rule may be opposite to the first event notification rule. For example, the first event notification rule may be: whether the PM 2.5 index is higher than 300, and the second event notification rule may be: whether the PM 2.5 index is lower than 300. In other words, the second event notification rule may be a rule for canceling the first event notification.

According to some embodiments of the present disclosure, determining whether a second event notification rule is satisfied may comprise receiving, by the service entity, a request from a requesting party, and determining whether a second event notification rule is satisfied based on the request. For example, in the example shown in FIG. 3 regarding the operation performed by the notified party, that is, in the example of the remaining electricity amount of the household electric meter, the subscriber 1 (serving as the requesting party) may perform, for example, an operation of paying the electricity bill after receiving the event notification. Next, the subscriber 1 may send a request to the service entity. After receiving this request, the service entity may send a second event notification to the rest notified parties other than the subscriber 1 for canceling, for example, the first event notification indicating that the remaining electricity amount is less than 5 degrees.

According to other embodiments of the present disclosure, the requesting party may be one of the at least one notified party, or may be the application entity (e.g., an electric meter) for receiving update data therefrom, and may also be other application entity, etc., no limitations are made herein. The request may be an update request, for example, after the subscriber 1 recharges the electric meter, the electric meter may send an update request to the service entity and send the updated electricity amount data, and the service entity may, based the updated electricity amount data, send a second event notification for canceling the first event notification to the notified party. In addition, the request may also be a creation request, a deletion request, and the like, no limitations are made herein.

According to some embodiments of the present disclosure, the university service entity may implement the above event notification method by way of defining a first event notification resource and a second event notification resource associated with the first event notification resource. For example, after receiving a subscription request, the service entity may create a subscription resource corresponding to the subscription request, the subscription resource may include a first event notification resource and a second event notification resource.

For example, the first event notification resource may include a first event notification rule attribute for determining whether to send a first event notification. In the case where the first event notification rule is satisfied, the service entity may determine to send the first event notification to all the notified parties, and in the case where the first event notification rule is not satisfied, the service entity determines not to send the first event notification. The first event notification resource may further include a first event notification list attribute for storing address information of the at least one notified party. For example, address information of the notified party 1, the notified party 2, and the notified party 3 shown in FIG. 2 may be stored in the first event notification list attribute. After determining to send the first event notification, the service entity may look up the address information of the notified party stored in the first event notification list, and send the first event notification based on the address information.

For example, the second event notification resource may include an event notification identifier attribute for associating the first event notification resource with the second event notification resource. For example, the event notification identifier attribute may associate the second event notification resource to the first event notification resource one by one, thereby canceling the first event notification by using the second event notification. The second event notification resource may further include a second event notification rule attribute and a second event notification list attribute. The second event notification rule attribute is used to determine whether to send a second event notification, the second event notification list attribute is used to store address information of the at least one notified party. The second event notification rule may be set opposite to the first event notification rule. For example, in the subscription request for sending a reminder notification when the remaining electricity amount is less than 5 degrees, the first event rule may be set as that the remaining electricity amount is less than 5 degrees, and the second event rule may be set as that the remaining electricity amount is not less than 5 degrees. According to other embodiments of the present disclosure, the second event notification rule may also be set in other manners. In the example of the subscription request to send a reminder notification when the doorbell is triggered, the first event notification rule may be set as the doorbell being triggered, and the second event rule may be set as the door being in an open state. The second event notification rule for canceling the first event notification may be set according to a specific application scenario, and the present disclosure does not limit the manner of setting the second event notification rule.

According to some embodiments of the present disclosure, the service entity may implement the above event notification method by way of defining a first subscription resource and a second subscription resource associated with the first subscription resource. For example, after receiving a subscription request, the service entity may create a first subscription resource and a second subscription resource corresponding to the subscription request.

According to some embodiments of the present disclosure, the first event notification rule attribute and the first event notification list attribute may be included in the first subscription resource. The first event notification rule attribute is used to determine whether to send a first event notification, the first event notification list attribute is used to store address information of the at least one notified party.

According to some embodiments of the present disclosure, the second subscription resource may include a subscription resource identifier attribute for associating the second subscription resource with the first subscription resource. The second subscription resource may further include a second event notification rule attribute and a second event notification list attribute. The second event notification rule attribute is used to determine whether to send a second event notification, the second event notification list attribute is used to store address information of the at least one notified party. For example, the subscription resource identifier attribute may associate the second subscription resource to the first subscription resource in a one-to-one correspondence, thereby canceling the first event notification by sending a second event notification to the notified party in the second event notification list.

According to some embodiments of the present disclosure, determining whether a second event notification rule is satisfied may comprise: determining, at a time point determined by a second event notification interval, whether a second event notification rule is satisfied. For example, the service entity may set a time interval for determining whether the second event notification rule is satisfied by creating a second event notification interval attribute. For example, the second event notification interval attribute may determine the second event notification interval as 1 hour, that is, after sending the first event notification to all the notified parties in the subscription request, the service entity triggers every hour a determination as to whether the second event notification rule is satisfied, and in the case where the second event notification rule is satisfied, it sends a second event notification to at least a part of the notified parties, for canceling the previously sent first event notification. The at least a part of the notified party may be, for example, the rest notified party that has not performed an operation, or may be all the notified parties.

According to some embodiments of the present disclosure, at least one notified party may be included in the subscription request, and the notified party is configured to receive an event notification. In the case where as plurality of notified parties are included in the subscription request, sending a second event notification to at least a part of the plurality of notified parties may comprise: receiving an event cancel request from one of the plurality of notified parties; sending, based on the event cancel request, a second event notification to at least a part of the plurality of notified parties.

For example, in the example shown in FIG. 3, when the first event notification rule is satisfied, the service entity will send the event notification 1 and the event notification 2 to the subscriber 1 and the subscriber 2 that serve as the notified party, respectively. The event notification 1 and the event notification 2 are both indicated as a first event notification. For example, the subscriber 1 can perform a corresponding operation based on the received event notification 1, such as paying an electricity bill. After performing the operation, the subscriber 1 may send an event cancel request to the service entity for requesting cancellation of the first event notification. After receiving the event cancel request, the service entity may send a second event notification for canceling the first event notification to the notified party other than the subscriber 1, that is, the subscriber 2, thereby preventing the subscriber 2 from performing a repetitive operation based on the received first event notification, such as paying an electricity bill. For example, the device of the subscriber 2 can hide displaying of the first event notification and the second event notification simultaneously after receiving the second event notification, that is, avoiding information interference with the subscriber 2. Alternatively, the device of the subscriber 2 may further display the first event notification and the second event notification in association after receiving the second event notification, thereby obviously reminding the user that the first event notification has been canceled, and the present disclosure makes no limitation to the operation made by the notified party after receiving the second event notification. In other embodiments according to the present disclosure, the service entity may also send the second event notification to all notified parties.

According to some embodiments of the present disclosure, the universal service entity may implement the above event notification method by way of defining a first event notification resource and a cancellation virtual resource associated with the first event notification resource. For example, after receiving the subscription request, the service entity may create a first event notification resource corresponding to the subscription request and a cancellation virtual resource. The cancellation virtual resource is used to perform an operation of sending a second event notification to at least a part of the plurality of notified parties based on the received event cancel request.

For example, the first event notification resource may include a first event notification rule attribute for determining whether to send a first event notification. In the case that the first event notification rule is satisfied, the service entity may determine to send a first event notification to all the notified parties, and in the case where the first event notification rule is not satisfied, the service entity determines not to send the first event notification. The first event notification resource may further include a first event notification list attribute used to store address information of the at least one notified party. For example, address information of the notified party 1, the notified party 2, and the notified party 3 shown in FIG. 2 may be stored in the first event notification list attribute. After determining to send the first event notification, the service entity may look up the address information of the notified party stored in the first event notification list, and send the first event notification based on the address information.

The event notification method according to the present disclosure can send a second event notification for canceling the first event notification to at least a part of the notified party after sending the first event notification to all the notified parties based on the subscription request, thereby avoid causing multiple notified parties to perform repeated or invalid operations based on the first event notification, ensuring real-time event notification and improving user experience.

Figure 5:
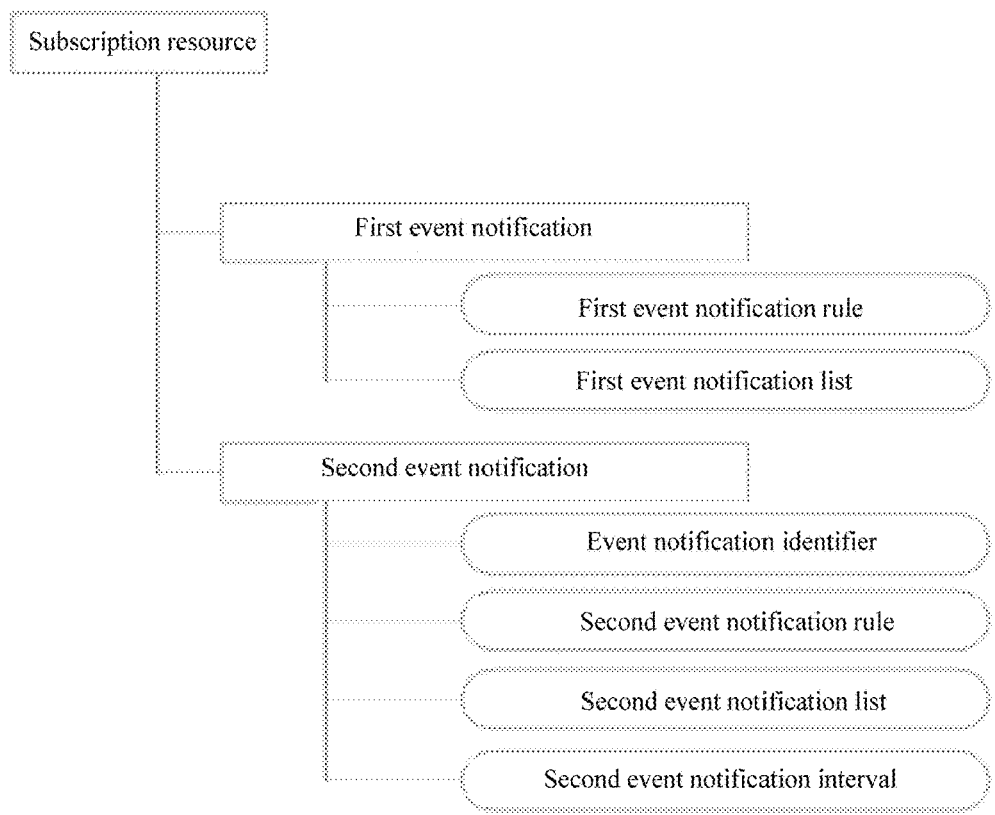
FIG. 5 illustrates a schematic diagram of resource structure of a subscription resource according to some embodiments of the present disclosure.
Figure 6:
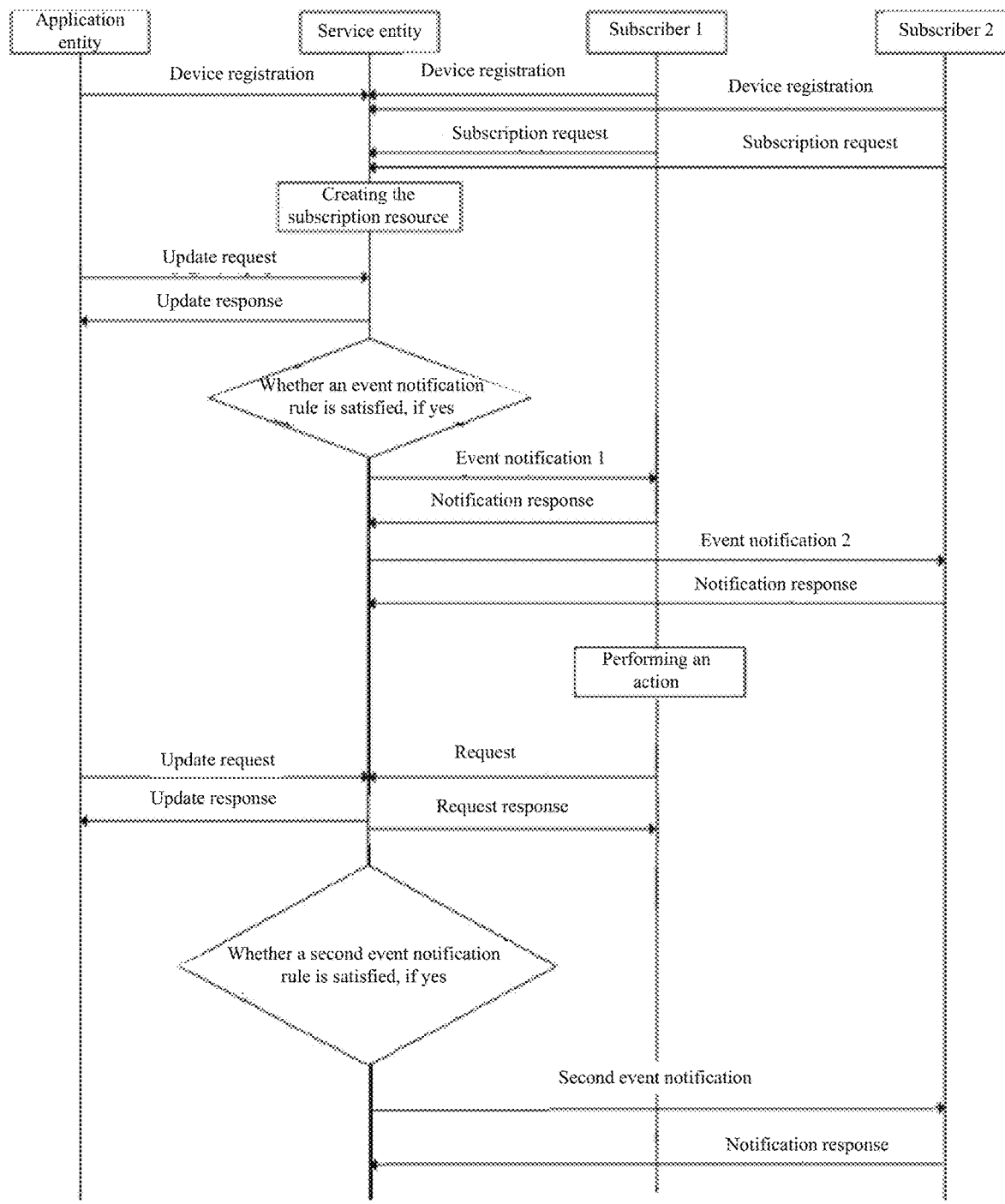
FIG. 6 illustrates a flow chart of performing event notification based on the resource structure shown in FIG. 5.

FIG. 5 illustrates a schematic diagram of resource structure of a subscription resource according to some embodiments of the present disclosure, FIG. 6 illustrates a flow chart of performing event notification based on the resource structure shown in FIG. 5. In the following, an event notification method according to some embodiments of the present disclosure and some embodiments thereof will be described in detail with reference to FIGS. 5 and 6.

As stated in the above, the Internet of Things may be composed of a universal service entity (or referred to as a service entity) and a series of application entities, which may be various sensor devices or user terminals such as mobile phones, and may also be software modules or the like in the devices, such as mobile phone applications. The universal service entity is for managing its connected application entities and performing operations such as registration, data transfer, execution of tasks, and the like. For example, as shown in FIG. 6, the service entity receives device registration requests from an application entity and a subscriber 1, a subscriber 2, thereby establishing an association relationship with the application entity, the subscriber 1 and the subscriber 2. In the application of subscribing request, the subscriber (e.g., subscriber 1 and subscriber 2) may send an event subscription request to the service entity, the event subscription request includes a plurality of notified parties. For example, the subscription request may be used to request for receipt of update data from the application entity, and the subscription request may also be used to request the service entity to perform a certain operation process, details are not described herein. After receiving the subscription request, the service entity may also send to the subscriber a subscription response message corresponding to the event subscription request.

For example, after receiving the same subscription request from the subscriber 1 and the subscriber 2 respectively, the service entity will create a subscription resource corresponding to the subscription request. For example, the subscription request shown in FIG. 6 may be used to request an event notification of the remaining electricity amount being less than 5 degrees, and the subscription request from the subscriber 1 and the subscriber 2 may include at least one notified party. The at least one notified party may be for example the subscriber 1 and the subscriber 2 in FIG. 6. As shown in FIG. 5, the subscription resource may include a first event notification resource for sending a first event notification, and a second event notification resource for sending a second event notification. It is to be noted that in resource structures such as those shown in FIG. 5, FIG. 7, and FIG. 9, resources are represented by square boxes, and attributes are represented by circular boxes.

As shown in FIG. 5, the first event notification resource may include: a first event notification rule attribute for determining whether to send a first event notification; and a first event notification list attribute for storing address information of the at least one notified party. The second event notification resource may include: an event notification identifier attribute for associating the second event notification resource with the first event notification resource; a second event notification rule attribute for determining whether to send a second event notification; a second event notification list attribute for storing address information of the at least one notified party.

In the above embodiment, the application entity in FIG. 6 may be a software module in the household electric meter that may periodically send an update request to the service entity for update data including the remaining electricity amount to the server entity. The service entity receives an update request from the application entity and sends an update response to the application entity. The application entity sends update data to the service entity based on the update response. After receiving the update data, the service entity may determine whether the update data satisfies an event notification rule, for example, whether the remaining electricity amount is less than 5 degrees. If the service entity determines that the update data does not satisfy the first event notification rule, for example, the remaining electricity amount is more than 5 degrees, no event notification is sent to the notified party. If the service entity determines that the update data satisfies the first event notification rule, for example, the remaining electricity amount is less than 5 degrees, the service entity sends a first event notification to all notified parties in the list of notified party. The first event notification may be the event notification 1 and the event notification 2 respectively sent to the subscriber 1 and the subscriber 2 shown in FIG. 6. The subscriber 1 that receives the event notification 1 may also send to the service entity a notification response corresponding to the event notification 1. Similarly, the subscriber 2 that receives the event notification 2 may also send a notification response corresponding to the event notification 2 to the service entity.

For example, after receiving the event notification 1, the subscriber 1 in FIG. 6 may send a notification response corresponding to the event notification to the service entity. In the foregoing subscription request, the subscriber 1 may be a terminal device of one of the family members, and after receiving the event notification that the remaining electricity amount is less than 5 degrees, a corresponding action may be performed to handle the event in time, for example, performing an action to pay an electricity bill, and a request may also be sent to a service entity, such as an update request.

The service entity may determine whether a second event notification rule is satisfied based on the update request sent by the subscriber 1, and in the case where the second event notification rule is satisfied, it sends the second event notification to at least a part of the at least one notified party.

For example, the service entity may determine that the subscriber 1 has made corresponding processing for the first event notification based on the update request sent by the subscriber 1, that is, the subscriber 2 is not required to perform the repeated payment operation. In this case, the service entity may determine that the second event notification rule is satisfied and send a second event notification to the notified party other than the subscriber 1, i.e., the subscriber 2, to cancel the event notification 2 sent by it to the subscriber 2. The subscriber 2 receiving the second event notification may also send a notification response corresponding to the second event notification to the service entity.

As shown in FIG. 5, the second event notification resource may further include a second event notification interval attribute for setting a time interval for determining whether the second event notification rule is satisfied. For example, determining whether a second event notification rule is satisfied may comprise determining whether a second event notification rule is satisfied at a time point determined by the second event notification interval (e.g., every hour). For example, the service entity in FIG. 6 may determine whether the second notification rule is satisfied based on an update request sent by the application entity. For example, determining, based on the update data sent by the application entity, that the current remaining electricity is greater than 5 degrees, and thereby determining that the second event notification rule is satisfied, and sending a second event notification to all of the notified parties, namely, the subscriber 1 and the subscriber 2, to cancel the event notification 1 and event notification 2 sent by it thereto.

In the example illustrated in FIGS. 5 and 6, the service entity implements the event notification method according to some embodiments of the present disclosure based on the first event notification resource and the second event notification resource, such that in the case where the second event notification is satisfied, the second event notification for canceling the first event notification is sent to at least one notified party, thereby avoiding, for example the subscriber 2, from performing an additional repeating operation.

According to other embodiments of the present disclosure, the service entity may also set the second event notification rule in other manners.

Figure 7:
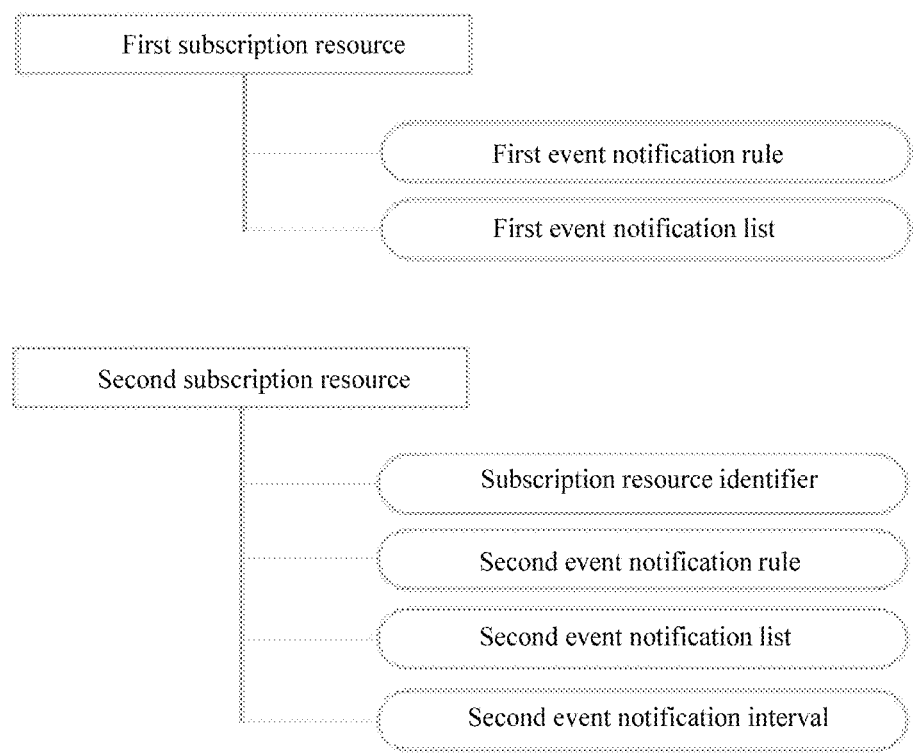
FIG. 7 illustrates a schematic diagram of resource structure of a subscription resource according to some embodiments of the present disclosure.
Figure 8:
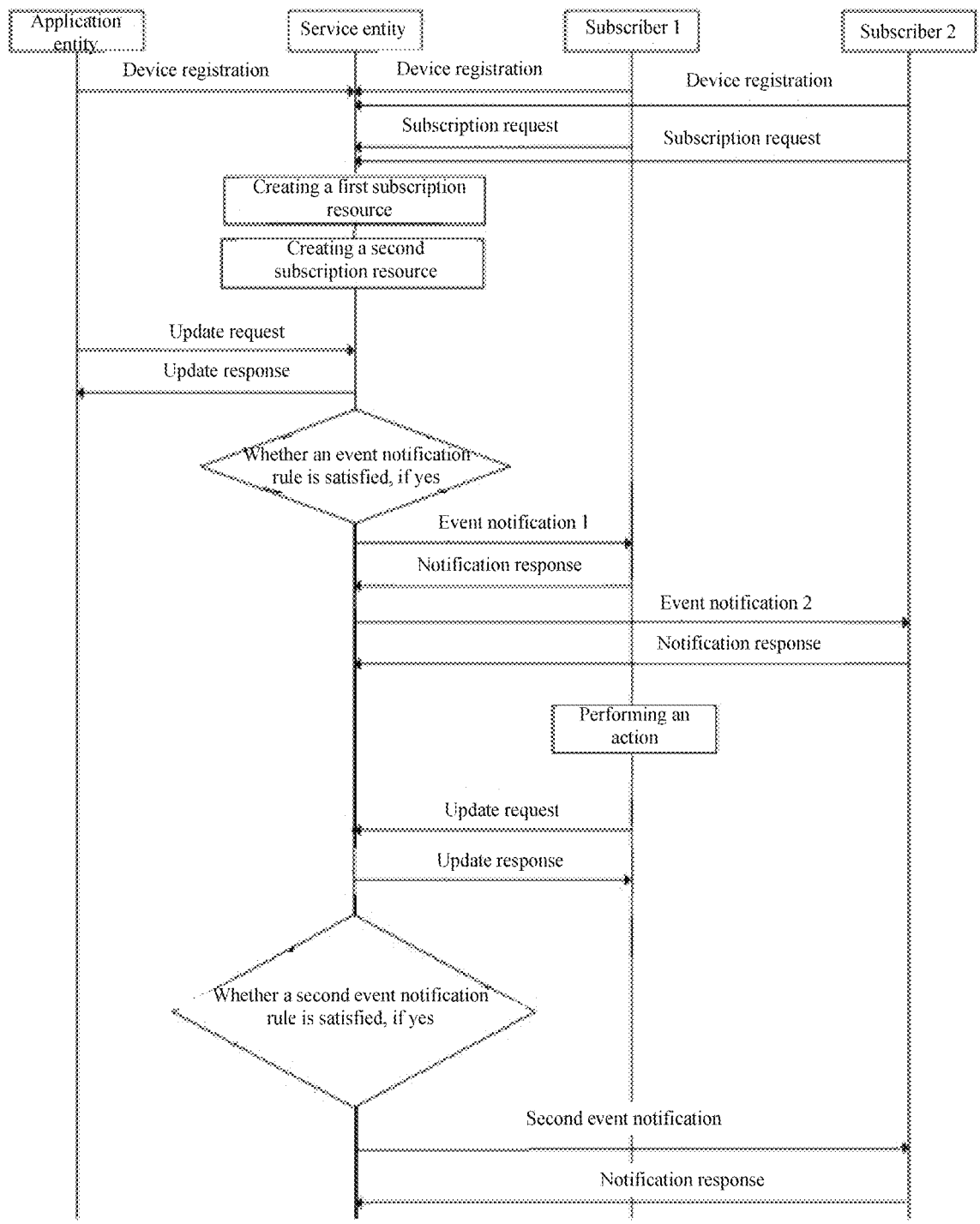
FIG. 8 illustrates a flow chart of performing event notification based on the resource structure shown in FIG. 7.

FIG. 7 illustrates a schematic diagram of resource structure of a subscription resource according to some embodiments of the present disclosure, FIG. 8 illustrates a flow chart of performing event notification based on the resource structure shown in FIG. 7. In the following, an event notification method according to the above-described embodiments and some embodiments thereof of the present disclosure will be described in detail with reference to FIGS. 7 and 8.

As shown in FIG. 7, the service entity may implement the event notification method according to the present disclosure by creating a first subscription resource and a second subscription resource associated with the first subscription resource. The first subscription resource may include a first event notification rule attribute used to determine whether to send a first event notification, and a first event notification list attribute used to store address information of the at least one notified party (e.g., the subscriber 1 and the subscriber 2). The second subscription resource may include a subscription resource identifier attribute used to associate the second subscription resource with the first subscription resource. The second subscription resource may further include a second event notification rule attribute used to determine whether to send the second event notification, and a second event notification list attribute used to store address information of the at least one notified party.

As shown in FIG. 7, the second subscription resource may further include a second event notification interval attribute used to set a time interval for determining whether the second event notification rule is satisfied. For example, determining whether a second event notification rule is satisfied may comprise determining whether a second event notification rule is satisfied at a time point determined by the second event notification interval (e.g., every hour).

For example, as shown in FIG. 8, the service entity may determine whether the second notification rule is satisfied based on an update request sent by the application entity. For example, determining, based on the update data sent by the application entity, that the current remaining electricity amount is greater than 5 degrees, and thereby determining that the second event notification rule is satisfied, and sending a second event notification to all of the notified parties, namely, the subscriber 1 and the subscriber 2, so as, to cancel the event notification 1 and event notification 2 that it sent thereto.

The manner of implementing event notification based on the first subscription resource and the second subscription resource illustrated in FIG. 8 may be similar to the manner of implementing event notification based on the subscription resource including the first event notification resource and the second event notification resource illustrated in FIG. 6, details will not be repeated here.

Figure 9:
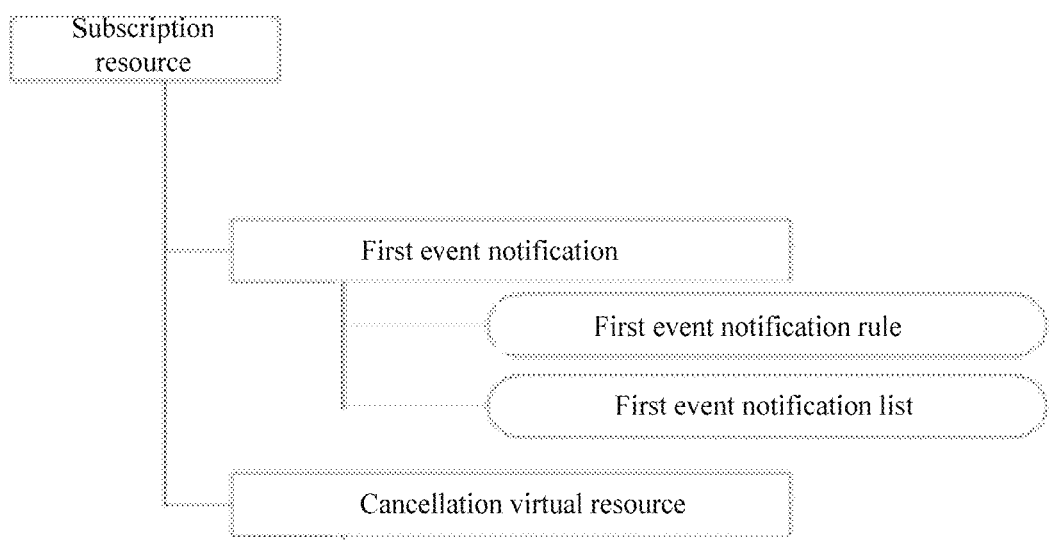
FIG. 9 illustrates a schematic diagram of resource structure of a subscription resource according to some embodiments of the present disclosure.
Figure 10:
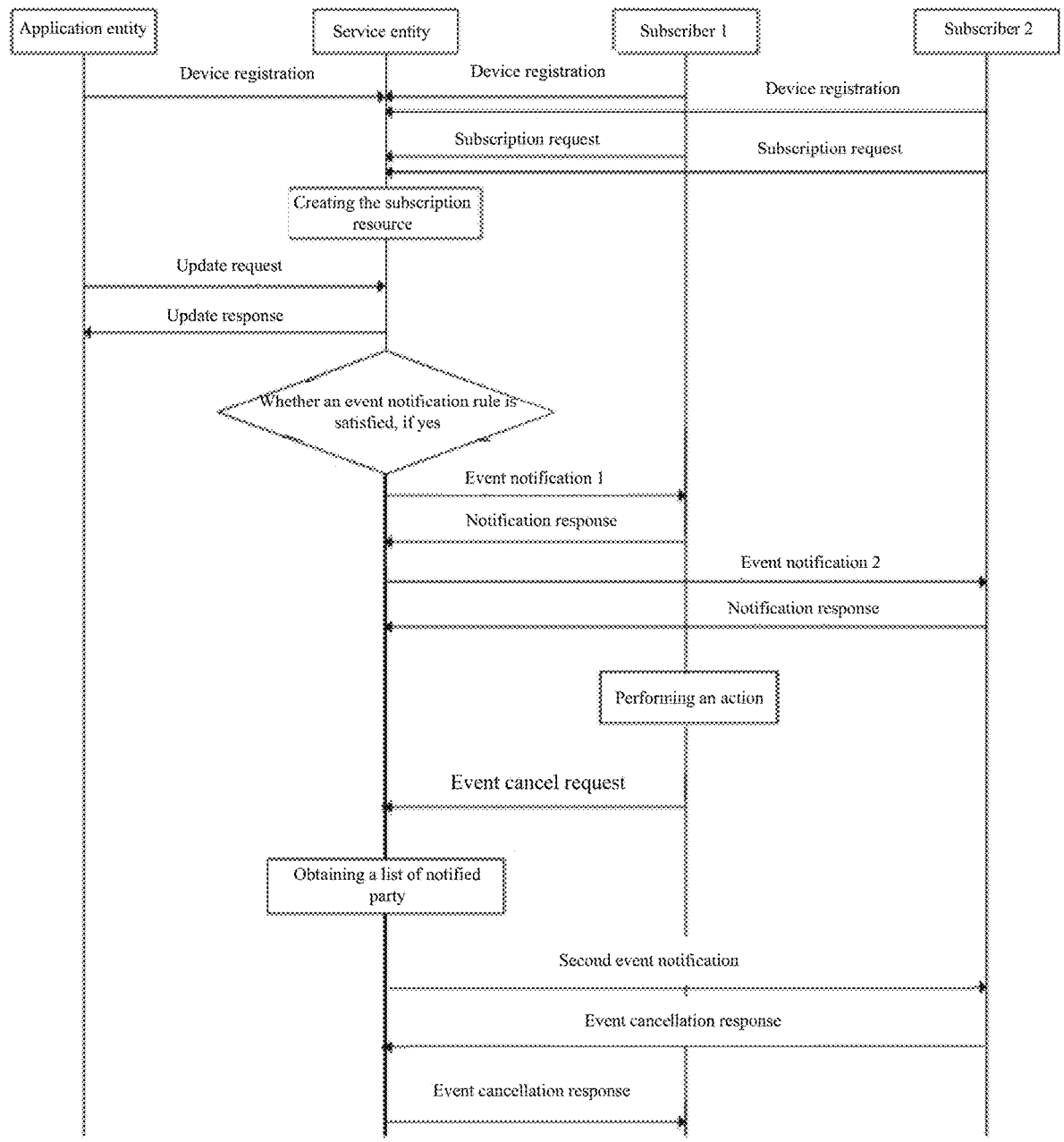
FIG. 10 illustrates a flow chart of performing event notification based on the resource structure shown in FIG. 9.

FIG. 9 illustrates a schematic diagram of resource structure of a subscription resource according to some embodiments of the present disclosure, FIG. 10 illustrates a flow chart of performing event notification based on the resource structure shown in FIG. 9. In the following, an event notification method according to the above-described embodiments of the present disclosure and some embodiments thereof will be described in detail with reference to FIGS. 9 and 10.

As shown in FIG. 10, a plurality of notified parties (e.g., the subscriber 1 and the subscriber 2) may be included in the subscription request. Upon receiving the subscription request, the service entity can implement the event notification method according to the present disclosure by creating a subscription resource.

As shown in FIG. 9, the subscription resource may include a first event notification resource and a cancellation virtual resource associated with the first event notification resource. The cancellation virtual resource is used to send a second event notification to at least a part of the plurality of notified parties based on the event cancel request, wherein the first event notification resource includes: a first event notification rule attribute for determining whether to send the first event notification, a first event notification list attribute for storing address information of the plurality of notified parties.

For example, the service entity determines that the first event notification rule (represented as an event notification rule in FIG. 10) is satisfied based on the update data sent by the application entity, and sends the event notification 1 and the event notification 2 to the subscriber 1 and the subscriber 2 stored in the first event notification list.

As shown in FIG. 10, after receiving the event notification 1, the subscriber 1 can perform a corresponding action, for example, paying an electricity bill, and sending an event cancel request to the service entity. After receiving the event cancel request, the service entity acquires the list notified party in the first event notification resource, and sends a second event notification to the notified parties to cancel the first event notification. For example, the service entity may send a second event notification to the notified party other than the subscriber 1, that is, the subscriber 2, thereby preventing the subscriber 2 from performing a repeated operation.

The event notification method provided according to the present disclosure is described above in connection with some specific embodiments, and after sending a first event notification to all notified parties based on a subscription request, a second event notification for canceling the first event notification may be sent to at least a part of the notified parties, so as to avoid causing the plurality of notified parties to perform repeated or invalid operations based on the first event notification, ensuring real-time performance of event notification and improving user experience.

Figure 11:
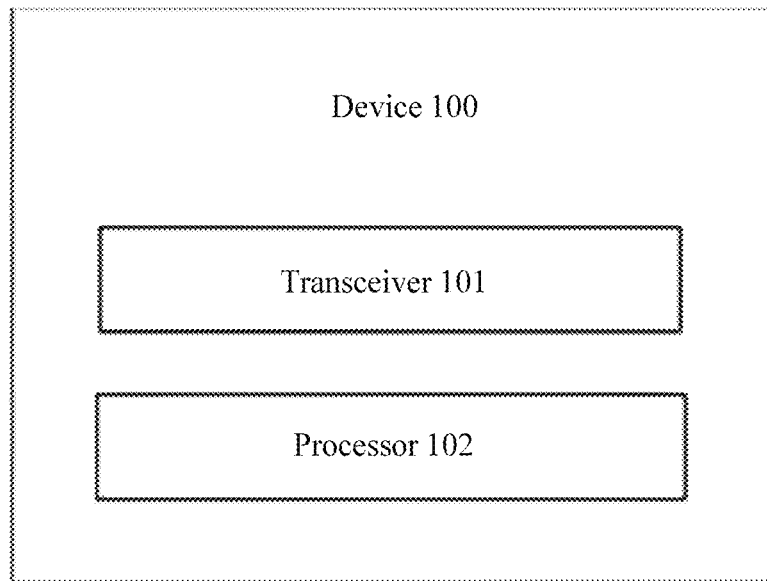
FIG. 11 illustrates a schematic block diagram of a server device according to some embodiments of the present disclosure.

According to some embodiments of the present disclosure, a server device is further provided. FIG. 11 shows a schematic diagram of a server device according to some embodiments of the present disclosure. The server device 100 may comprise a transceiver 101 and a processor 102, wherein the transceiver 101 may be configured to receive an event subscription request from a subscriber, the event subscription request including at least one notified party; the processor 102 may be configured to instruct the transceiver 101 to send a first event notification to the at least one notified party, and instruct the transceiver 101 to send a second event notification to at least a part of the at least one notified party, the second event notification being for cancelling the first event notification.

According to some embodiments of the present disclosure, the processor 102 is further configured to: determine whether a first event notification rule is satisfied, and in the case where the first event notification rule is satisfied, instruct the transceiver 101 to send a first event notification to each of the at least one notified party.

According to some embodiments of the present disclosure, the processor 102 is further configured to: determine whether a second event notification rule is satisfied, and in the case where the second event notification rule is satisfied, instruct the transceiver 101 to send a second event notification to at least a part of the at least one notified party.

Optionally, the server device 100 may also have a built-in or external memory for storing resources created for the application entity, and storing related instructions, which when executed by the processor 102, cause the steps of the event notification method described above to be performed.

Figure 12:
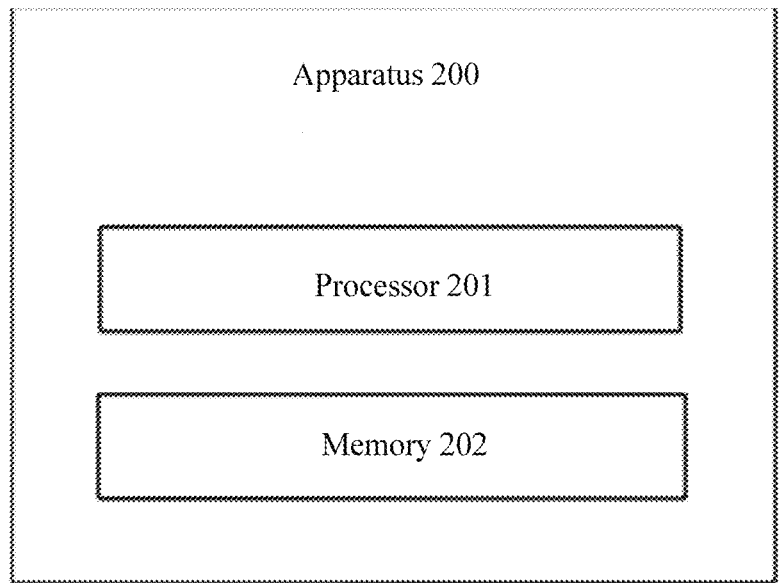
FIG. 12 illustrates a schematic block diagram of an event notification apparatus according to some embodiments of the present disclosure.

According to some embodiments of the present disclosure, an event notification apparatus is further provided. FIG. 12 shows a schematic diagram of an event notification apparatus according to some embodiments of the present disclosure. The event notification apparatus 200 may comprise one or more processors 201 and one or more memories 202. The computer-readable codes are stored in the processor 201, and the computer-readable codes can cause the event notification method as described above to be performed when executed by the one or more processors 202, and details are not described herein.

According to some embodiments of the present disclosure, a computer storage medium is further provided. The computer-readable codes are stored in the computer storage medium, and the computer-readable codes can cause the event notification method as described above to be performed when executed by one or more processors, and details are not described herein. The computer storage medium can be any available storage medium that can be accessed by a computer. By way of example and not limitation, such computer-readable medium may include RAM, ROM, EEPROM, CD-ROM or other optical disk storage, disk storage or other magnetic storage device, or any other medium that can be used to carry or store instructions or expected program codes in the form of data structures and can be accessed by a computer.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

This application claims the priority of Chinese Patent Application No. 201811454645.7, filed on Nov. 30, 2018, which is hereby incorporated by reference in its entirety as a part of this application.

What is claimed is:

1. An event notification method performed by a service entity, comprising:
receiving an event subscription request from a subscriber, the event subscription request including at least one notified party and a first event notification rule;
determining whether the first event notification rule is satisfied, and in the case where the first event notification rule is satisfied, sending a first event notification to the at least one notified party;
sending a second event notification for canceling the first event notification to at least a part of the at least one notified party, in response to a request from one of the at least one notified party.

2. The method of claim 1, wherein sending a first event notification to the at least one notified party comprises:
determining whether the first event notification rule is satisfied, and in the case where the first event notification rule is satisfied, sending the first event notification to each notified party of the at least one notified party.

3. The method of claim 2, wherein sending a second event notification to at least a part of the at least one notified party comprises:
determining whether a second event notification rule is satisfied, and in the case where the second event notification rule is satisfied, sending the second event notification to at least a part of the at least one notified party.

4. The method of claim 3, wherein determining whether a second event notification rule is satisfied comprises:
receiving a request from a requesting party;
determining whether the second event notification rule is satisfied based on the request.

5. The method of claim 3, wherein determining whether a second event notification rule is satisfied comprises:
determining, at a time point determined by a second event notification interval, whether the second event notification rule is satisfied.

6. The method of claim 4, further comprising defining a first event notification resource and a second event notification resource associated with the first event notification resource, wherein the first event notification resource includes:
a first event notification rule attribute for determining whether to send the first event notification; and
a first event notification list attribute for storing address information of the at least one notified party,
the second event notification resource includes:
an event notification identifier attribute for associating the second event notification resource with the first event notification resource;
a second event notification rule attribute for determining whether to send the second event notification;
a second event notification list attribute for storing address information of the at least one notified party.

7. The method of claim 6, wherein the second event notification resource further includes:

a second event notification interval attribute for setting a time interval for determining whether the second event notification rule is satisfied.

8. The method of claim 1, wherein the event subscription request includes a plurality of notified parties, and sending a second event notification to at least a part of the plurality of notified parties comprises:
receiving an event cancel request from one notified party of the plurality of notified parties;
sending, based on the event cancel request, the second event notification to at least a part of the plurality of notified parties.

9. The method of claim 8, further comprising defining a first event notification resource and a cancellation virtual resource associated with the first event notification resource, the cancellation virtual resource being for sending, based on the event cancel request, a second event notification to at least a part of the plurality of notified parties, wherein the first event notification resource includes:
a first event notification rule attribute for determining whether to send the first event notification; and
a first event notification list attribute for storing address information of the plurality of notified parties.

10. The method of claim 4, further comprising defining a first subscription resource and a second subscription resource associated with the first subscription resource, wherein the first subscription resource includes:
a first event notification rule attribute for determining whether to send the first event notification; and
a first event notification list attribute for storing address information of the at least one notified party,
the second event notification resource includes:
an event notification identifier attribute for associating the second event notification resource with the first event notification resource;
a second event notification rule attribute for determining whether to send the second event notification;
a second event notification list attribute for storing address information of the at least one notified party.

11. The method of claim 1, wherein the event subscription request is for requesting to receive update data from an application entity, the method further comprises:
determining, based on the update data, whether the first event notification rule is satisfied.

12. The method of claim 1, wherein notification content of the second event notification is opposite to notification content of the first event notification.

13. The method of claim 3, wherein the second event notification rule is a rule for canceling the first event notification.

14. The method of claim 5, further comprising defining a first event notification resource and a second event notification resource associated with the first event notification resource, wherein the first event notification resource includes:
a first event notification rule attribute for determining whether to send the first event notification; and
a first event notification list attribute for storing address information of the at least one notified party,
the second event notification resource includes:
an event notification identifier attribute for associating the second event notification resource with the first event notification resource;
a second event notification rule attribute for determining whether to send the second event notification;
a second event notification list attribute for storing address information of the at least one notified party.

15. The method of claim 5, further comprising defining a first subscription resource and a second subscription resource associated with the first subscription resource, wherein the first subscription resource includes:
- a first event notification rule attribute for determining whether to send the first event notification; and
- a first event notification list attribute for storing address information of the at least one notified party, the second event notification resource includes:
- an subscription resource identifier attribute for associating the first subscription resource with the second subscription resource;
- a second event notification rule attribute for determining whether to send the second event notification;
- a second event notification list attribute for storing address information of the at least one notified party.

16. A server device, comprising a transceiver and a processor, wherein the transceiver is configured to receive an event subscription request from a subscriber, the event subscription request including at least one notified party and a first event notification rule; the processor is configured to determine whether the first event notification rule is satisfied, and in the case where the first event notification rule is satisfied, instruct the transceiver to send a first event notification to the at least one notified party, and instruct the transceiver to send a second event notification for canceling the first event notification to at least a part of the at least one notified party, in response to a request from one of the at least one notified party.

17. The server device of claim 16, wherein the processor is configured to determine whether a first event notification rule is satisfied, and in the case where the first event notification rule is satisfied, instruct the transceiver to send the first event notification to each of the at least one notified party.

18. The server device of claim 17, wherein the processor is configured to determine whether a second event notification rule is satisfied, and in the case where the second event notification rule is satisfied, instruct the transceiver to send the second event notification to at least a part of the at least one notified party.

19. An event notification apparatus, comprising:
- one or more processors; and
- one or more memories in which computer-readable codes are stored, the computer-readable codes causing, when executed by the one or more processors, the event notification method of claim 1 to be performed.

20. A computer storage medium having stored thereon computer-readable codes, the computer-readable codes causing, when executed by one or more processors, the event notification method of claim 1 to be performed.

* * * * *